April 24, 1956  H. BECK ET AL  2,743,141
PRESS FIT ARRANGEMENT
Filed July 9, 1953

Inventors:
Hans Beck
Heinrich Fink
by: Michael S. Striker
agt.

United States Patent Office 2,743,141
Patented Apr. 24, 1956

2,743,141
PRESS FIT ARRANGEMENT

Hans Beck, Stuttgart, and Heinrich Fink, Esslingen, Germany, assignors to SKF Kugellagerfabriken Gesellschaft mit beschränkter Haftung, Schweinfurt, Germany Application July 9, 1953, Serial No. 367,050

Claims priority, application Germany January 29, 1953

1 Claim. (Cl. 308—18)

The present invention relates to a device having two annular members frictionally attached to each other by an interference fit, and more particularly, to an interference fit arrangement for frictionally attaching an anti-friction bearing to a supporting member bearing an annular wall portion whose thickness is smaller than the thickness of the bearing ring, said arrangement being part of a guide roller as used for textile machinery.

It is known to rotatably support guide rollers on anti-friction bearings which are pressed into an annular support. However, the known arrangements have the disadvantage that the anti-friction bearing ring is strained and stressed by the interference fit whereby essential dimensions are changed. The play of the anti-friction elements in the bearing ring is influenced if the anti-friction bearing ring is attached to a supporting member by an interference fit, and the extent of the change of dimensions can only be approximately calculated. Consequently, it has been necessary in interference fit arrangements for anti-friction bearings to carry out extensive tests in order to find the relative dimensions of the elements required for obtaining smooth running of the anti-friction elements on the strained anti-friction bearing ring. Moreover, the tolerance between the diameters of the engaging faces is limited in the known arrangements. Frequently, an element is unduly strained and breaks, or loses part of its bearing capacity.

It is the object of the present invention to overcome the disadvantages of the known constructions and to provide an interference fit for two members in which one member is for all practical purposes not deformed at all.

It is another object of the present invention to obtain practically zero deformation of an annular member attached by an interference fit to another member by straining the other member above the elastic limit of the material of which the same consists.

It is a further object of the present invention to attach an anti-friction bearing ring to an annular supporting member by an interference fit in such manner that the supporting annular member is strained above the elastic limit of the material of the same, and the anti-friction bearing ring is elastically deformed to an almost imperceptible extent.

Consequently, it is also an object of the present invention to press an anti-friction bearing ring into a thin supporting annular portion of a guide roller in such manner that the deformation of the anti-friction bearing ring is so insignificant that the play of the bearing is still within the prescribed tolerances after the interference fit has been effected so as to not influence the smooth running of the bearing in any way.

With these objects in view, the present invention mainly consists in a construction in which two annular members are connected by an interference fit, one of said members consisting of a material having a lower elastic limit and being permanently deformed, and the other of said members consisting of a material having a higher elastic limit and being elastically deformed, the thickness of the first-named member being smaller than the thickness of the second-named member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
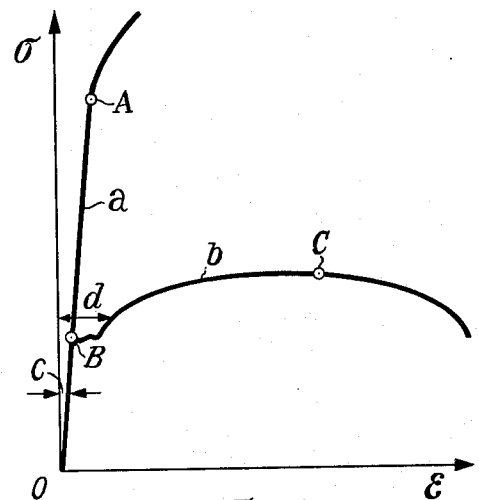
Fig. 1 shows tension-deformation graphs for two different steels.

Referring now to Fig. 1, the vertical axis indicates tension, and the horizontal axis indicates the strain or deformation which is an elongation if tensile forces produce the strain in the material.

The graph $a$ refers to a steel as used for roller bearing rings and begins with a straight portion ending in the point A, which is the yield point of the material corresponding to the elastic limit of the same. Beyond the point A plastic deformation takes place.

The graph $b$ refers to a softer steel as used for pressing and drawing cupped elements from metal sheets. The graph $b$ also begins with a straight portion which coincides with a portion of the graph $a$. Due to properties of the second material, the straight portion of graph $b$ is shorter and ends in the point B indicating the end of elastic deformation and the beginning of plastic deformation, the point B being the elastic limit or yield point. At a point C further tensioning of the material will result in breaking, and point C therefore indicates the breaking load.

Figure 2:
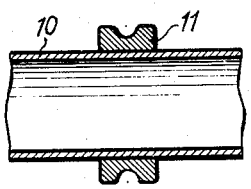
Fig. 2 is a fragmentary sectional view of an embodiment of the present invention.

Fig. 2 illustrates a supporting annular or tubular element 10 consisting of a material having the properties illustrated in the graph $b$, and a roller bearing ring 11 attached to member 10 by an interference fit.

Figure 3:
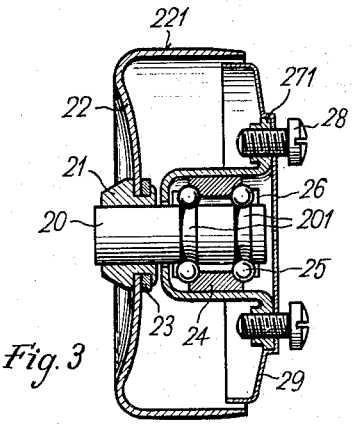
Fig. 3 is a sectional view through a guide roller according to a preferred embodiment of the present invention.

Fig. 3 illustrates a guide or tension roller as is used for tensioning of bands in textile machines. A hub 21 is fixedly secured on a shaft 20, and supports a member 22 having a rim portion 221. The member 22 is attached to the hub 21 by means of a ring 23. The shaft 20 is formed with grooves 201 in which the balls 25 roll. The outer ring 24 of the ball bearing is attached to an annular wall portion of the cup-shaped supporting member 27 by an interference fit. Member 27 is provided with an axial opening through which shaft 20 passes. The cup-shaped member 27 is thinner than ring 24 and provided with a flange 271 to which a closure plate 29 is secured by means of screws 28. Cages 26 prevent axial movement of the balls 25.

Before the members 24 and 27 are attached to each other, the outer diameter of the member 24 is slightly greater than the inner diameter of the member 27 so that member 24 is compressed, and member 27 expanded in the interference fit shown in Fig. 3.

According to a preferred embodiment of the present invention, the ball bearing ring 24 consists of the steel having properties illustrated in graph $a$, and the outer supporting member 27 has properties illustrated in the graph $b$. The difference between the original diameters of the members 24 and 27 is such that the thin-walled supporting member 27 is strained to a point beyond the elastic limit B and below the breaking load C. As a result of this arrangement, the supporting member 27 is permanently deformed so that the elastic deformation of the ball bearing ring 24 is very small and will be found in the lower portion of the straight portion of the graph a.

The strain or deformation of the ball bearing ring 24 corresponds to the distance c in Fig. 1, while the strain or deformation of the supporting member 27 corresponds to the distance d. Since the ball bearing ring 24 is compressed, the tension has a negative value which, however, does not change the ratio between the distance c and d in Fig. 1.

The same conditions are present in the embodiment shown in Fig. 2. In this embodiment the ball bearing ring 11 is elastically expanded to a small extent, while the annular supporting member 10 consisting of the metal having the properties shown in graph b is strained and compressed beyond the elastic limit.

It will be understood that the interference fit according to the present invention can also be applied to two members consisting of the same material if the dimensions of the members are suitably selected. A thin-walled supporting member will be stressed beyond the elastic limit, while the thicker and more compact ball bearing ring will be strained within the elastic limit even if the same material is used for both members. However, preferably steels having different elastic properties will be applied in the interference fit according to the present invention.

An interference fit according to the present invention obtains the highly advantageous result that the supporting member will be subjected to the greater part of the dimensional changes required for obtaining the pressure between the attached members. During the pressing operation by which the two members are attached to each other, the material of the supporting member is first elastically, and then permanently deformed, while the material of the ball bearing ring remains elastically deformed. A predetermined difference between the diameters of the two attached members produces a much smaller tension in the ball bearing ring if the supporting member is permanently deformed in the region of plastic deformation than the tension produced in the ball bearing ring if the supporting member were elastically deformed.

By suitable choice of the yield points of the materials, of the wall thicknesses of the attached members, and of the difference between the diameters of the members, the elastic deformation of the roller bearing ring can be kept within small limits so that no undesirable change of the bearing play occurs after the two annular members have been connected by an interference fit. This is of particular importance, if the bearing is completely assembled before being pressed into the supporting annular member.

Another advantageous result of the present invention resides therein that it is not necessary to keep the tolerances for the interference fit within narrow limits since a greater difference between the diameters of the inner and outer members will only effect a permanent deformation of the supporting annular member without causing undesirable tensions and thereby detrimental deformation of the roller bearing ring. The maximum tolerance is determined by the breaking load of the annular supporting member, which, of course, must not be reached.

It will be understood that each of the elements described above, or two or more together, may also find a useful application in other types of interference fit arrangements differing from the types described above.

While the invention has been illustrated and described as embodied in a roller bearing ring attached to an annular supporting member by an interference fit in such manner that the supporting member is permanently deformed beyond the elastic limit while the roller bearing ring is only elastically deformed, it is not intended to be limited to the details shown, since various modifications and structural changes may be made without departing in any way from the spirit of the present invention.

Without furhter analysis, the foregoing will so fully reveal the gist of the present invention that others can by applying current knowledge readily adapt it for various applications without omitting features that, from the standpont of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A bearing arrangement comprising, in combination, a cup-shaped supporting member having an annular wall portion, said supporting member having at one end thereof an outwardly projecting flange portion, and being formed at the other end thereof with a central opening; an anti-friction bearing ring member having an inner surface formed with annular grooves, said bearing ring member being located in said cup-shaped supporting member and being attached with the outer surface thereof to said annular wall portion by an interference fit, the wall thickness of said annular wall portion of said cup-shaped supporting member being smaller than the thickness of said bearing ring, said cup-shaped supporting member consisting of a metal having a lower elastic limit, and said bearing ring member consisting of metal having an elastic limit higher than the elastic limit of said supporting member, said annular wall portion of said cup-shaped supporting member being permanently deformed and stressed above said lower elastic limit and said bearing ring member being elastically deformed; a shaft means passing through said central opening in said cup-shaped supporting member and having a first portion located outwardly of the same and a second portion formed with annular grooves and located within said bearing ring member; roller means located between said bearing ring member and said second shaft portion and engaging said annular grooves in the same and in said bearing ring; pulley means secured to said first shaft portion for rotation therewith; a closure plate abutting said flange portion and forming together with said cup-shaped supporting member a casing; and means for attaching said closure plate to said flange portion of said supporting member and for attaching said supporting member to a stationary support.

References Cited in the file of this patent
UNITED STATES PATENTS

| | | |
|---|---|---|
| 1,643,977 | Buckwalter | Oct. 4, 1927 |
| 2,513,599 | Thomas | July 4, 1950 |
| 2,703,261 | Beck et al. | Mar. 1, 1955 |